Patented Nov. 22, 1927.

1,650,158

UNITED STATES PATENT OFFICE.

ROBERT EMANUEL SCHMIDT, OF ELBERFELD, GERMANY, ASSIGNOR TO GRASSELLI DYESTUFF CORPORATION, OF NEW YORK, N. Y., A CORPORATION OF DELAWARE.

PROCESS OF SPLITTING OFF SULPHO GROUPS FROM ANTHRAQUINONE SULPHONIC ACID DERIVATIVES.

No Drawing. Application filed August 3, 1926, Serial No. 126,932, and in Austria April 8, 1926.

The present invention relates to the use of particular alkaline agents for splitting off sulpho groups from anthraquinone sulphonic acid hydro compounds.

I have shown in my application Serial No. 101,780 filed April 13, 1926, that anthraquinone sulphonic acid derivatives; i. e., hydroxy, amino and arylamino substituted anthraquinone sulphonic acids can be reduced in slightly acid, neutral or weakly alkaline solutions to hydro compounds. These hydro compounds, when treated with alkaline agents, such as dilute caustic soda, potassium or sodium carbonate solutions, etc., loose a sulpho group which is eliminated in form of sulphurous acid.

I have now found that pyridine bases, and especially pyridine itself, are particularly suited alkaline agents to achieve this elimination of a sulpho group from anthraquinone sulphonic acid hydro compounds.

The hydro compounds, in contradistinction to the leuco compounds, are not reverted to the parent material by oxydation. Their structural formula is not exactly known, but as a mere illustration in the present invention, a formula of the following type might be assumed:

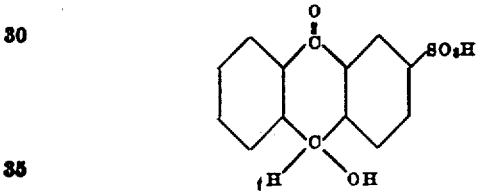

If a pyridine base is added to an aqueous solution of such a hydro compound and the solution heated sulphurous acid is split off and an anthraquinone type compound recovered.

It is, however, not necessary to prepare and isolate the hydro compound in substances.

If pyridine is added to the solution obtained by reducing an anthraquinone sulphonic acid derivative in slightly acid, neutral or weakly alkaline solution, or by carrying out the reduction directly in a solution containing pyridine and heating afterwards, the resulphonated anthraquinone compounds are obtained very easily and with excellent purity and yields.

I wish it to be understood that the term anthraquinone sulphonic acid derivative as used herein is meant to comprise such anthraquinone sulphonic acids as contain at least one of the groups hydroxy, amino, or alkylamino or several like or different of the above mentioned substituents.

The following example will further illustrate my invention, the parts being by weight, but I wish it to be understood that my invention is not limited to the particular substances, nor to the exact reaction conditions mentioned herein.

*Example 1.*—10 parts p-diamino-anthrarufin monosulphonic acid of the formula:

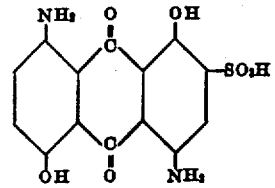

are dissolved in 1000 parts water, containing 150 parts of pyridine. The solution is heated to 85–90° C. and to the blue solution obtained one adds 10 parts sodium hydosulphite. The color of the solution turns red, due to the formation of the hydro compound. On continued heating crystalline needles start to separate and when the solution has become practically colorless the precipitate is filtered off, washed with water and dried. It represents practically pure para-diaminoanthrarufin.

*Example 2.*—10 parts p-diamino-anthrarufin-disulphonic acid are dissolved in 850 parts water and 150 parts pyridine and the solution heated on the water bath to about 85–90° C. 12 parts sodium hydrosulphite are then added in small portions, subsequent portions only being added after the preceding one has reacted and the hydro compound formed lost its sulpho group. When about half of the hydrosulphite has been added crystals of p-diamino-anthrarufin start to separate. The solution should have only a violetish or faint reddish tint after all of the hydrosulphite has been added. The p-diamino-anthrarufin formed is then filtered off, washed and dried. It is obtained exceedingly pure and with an excellent yield.

This application is a continuation in part of my application Serial No. 101,780, filed April 13, 1926.

I claim:—

1. In processes of splitting off sulpho groups from anthraquinone sulphonic acid derivatives the step which consists in heating the hydro compounds thereof in the presence of a pyridine base.

2. In processes of splitting off sulpho groups from anthraquinone sulphonic acid derivatives the step which consists in heating the hydro compounds thereof in the presence of pyridine.

3. Process of splitting off sulpho groups from anthraquinone sulphonic acid derivatives which comprises reducing such derivatives to their corresponding hydro compounds in the presence of a pyridine base and heating the resulting reaction mixture.

4. Process of splitting off sulpho groups from anthraquinone sulphonic acid derivatives which comprises reducing such derivatives to their corresponding hydro compounds in the presence of pyridine and heating the resulting reaction mixture.

5. Process of splitting off sulpho groups from anthraquinone sulphonic acid derivatives which comprises heating a solution thereof in the presence of a pyridine base and a reducing agent.

6. Process of splitting off sulpho groups from anthraquinone sulphonic acid derivatives which comprises heating a solution thereof in the presence of pyridine and a reducing agent.

In testimony whereof, I affix my signature.

ROBERT EMANUEL SCHMIDT.

of my application Serial No. 101,780, filed April 13, 1926.

I claim:—

1. In processes of splitting off sulpho groups from anthraquinone sulphonic acid derivatives the step which consists in heating the hydro compounds thereof in the presence of a pyridine base.

2. In processes of splitting off sulpho groups from anthraquinone sulphonic acid derivatives the step which consists in heating the hydro compounds thereof in the presence of pyridine.

3. Process of splitting off sulpho groups from anthraquinone sulphonic acid derivatives which comprises reducing such derivatives to their corresponding hydro compounds in the presence of a pyridine base and heating the resulting reaction mixture.

4. Process of splitting off sulpho groups from anthraquinone sulphonic acid derivatives which comprises reducing such derivatives to their corresponding hydro compounds in the presence of pyridine and heating the resulting reaction mixture.

5. Process of splitting off sulpho groups from anthraquinone sulphonic acid derivatives which comprises heating a solution thereof in the presence of a pyridine base and a reducing agent.

6. Process of splitting off sulpho groups from anthraquinone sulphonic acid derivatives which comprises heating a solution thereof in the presence of pyridine and a reducing agent.

In testimony whereof, I affix my signature.

ROBERT EMANUEL SCHMIDT.

CERTIFICATE OF CORRECTION.

Patent No. 1,650,158.   Granted November 22, 1927, to

ROBERT EMANUEL SCHMIDT.

It is hereby certified that error appears in the printed specification of the above numbered patent requiring correction as follows: Page 1, line 51, for the word "resulphonated" read "desulphonated"; and that the said Letters Patent should be read with this correction therein that the same may conform to the record of the case in the Patent Office.

Signed and sealed this 27th day of December, A. D. 1927.

Seal.

M. J. Moore,
Acting Commissioner of Patents.

CERTIFICATE OF CORRECTION.

Patent No. 1,650,158.             Granted November 22, 1927, to

ROBERT EMANUEL SCHMIDT.

It is hereby certified that error appears in the printed specification of the above numbered patent requiring correction as follows: Page 1, line 51, for the word "resulphonated" read "desulphonated"; and that the said Letters Patent should be read with this correction therein that the same may conform to the record of the case in the Patent Office.

Signed and sealed this 27th day of December, A. D. 1927.

Seal.                                        M. J. Moore,
                                                       Acting Commissioner of Patents.